G. N. BLANCHARD.
METHOD OF PRODUCING CHLORINE GAS.
APPLICATION FILED JULY 21, 1920. RENEWED MAY 31, 1922.

1,430,785.

Patented Oct. 3, 1922.

INVENTOR
GEORGE N. BLANCHARD
BY

ATTORNEY

Patented Oct. 3, 1922.

1,430,785

UNITED STATES PATENT OFFICE.

GEORGE N. BLANCHARD, OF SAN FRANCISCO, CALIFORNIA.

METHOD OF PRODUCING CHLORINE GAS.

Application filed July 21, 1920, Serial No. 397,978. Renewed May 31, 1922. Serial No. 564,854.

*To all whom it may concern:*

Be it known that I, GEORGE N. BLANCHARD, a citizen of the United States of America, residing at San Francisco, in the county of San Francisco and State of California, have invented certain new and useful Improvements in Methods of Producing Chlorine Gas, of which the following is a specification.

The present invention is an improved method of and apparatus for uniformly producing chlorine gas in a fixed ratio to water for water purification.

The principal object of the invention is to provide a method and apparatus by which it is possible to produce chlorine gas in definite proportions of water and gas for the purification of water, the said proportion being established by an analysis of the water, and to provide means for varying the production of chlorine gas under conditions where the flow of the water is variable.

In the invention hereinafter described, chlorine gas is produced in direct proportion to current flow, that is in amperes.

It is now common practice in chlorination to generate the chlorine gas from salt water in chemical cells in large quantities. The electrical current is usually supplied by a dynamo provided with a hand rheostat and an ammeter for current regulation. The gas is then dried and compressed in sealed bottles and delivered to purification plants in these containers. The gas is taken from the containers through a reducing valve and a meter, and is then introduced into the body of water to be treated.

In my invention chlorine gas is produced from salt water in chemical cells, as before mentioned, but the current which produces it is automatically kept constant by the apparatus itself, thus insuring a constant dosage of chlorine gas to the water. Should the water flow be variable it is possible with slight variations or modifications of this apparatus to connect the water flow with the rectifier to maintain the fixed ratio of gas to water regardless of flow.

In this specification and the annexed drawings, the invention is illustrated in the form considered to be the best, but it is to be understood that the invention is not limited to such form, because it may be embodied in other forms, and it is also to be understood that in and by the claim following the description it is desired to cover the invention in whatsoever form it may be embodied.

Alternating current at ordinary voltage, i. e., 110 or 220 volts, is used to operate our apparatus, entering the same on the wires A and B leading to the primary and secondary windings of a constant current transformer, adapted to give the requisite low voltage for chemical cells. This secondary current is changed to a pulsating direct current by a rectifier C, whence it is directed through a chemical cell D by an automatic pole changer E.

Attention is called to a copending application by George N. Blanchard, filed July 28th, 1919, bearing Serial Number 313,930, one half interest assigned to said Fred V. Hammerly.

Figure 1:
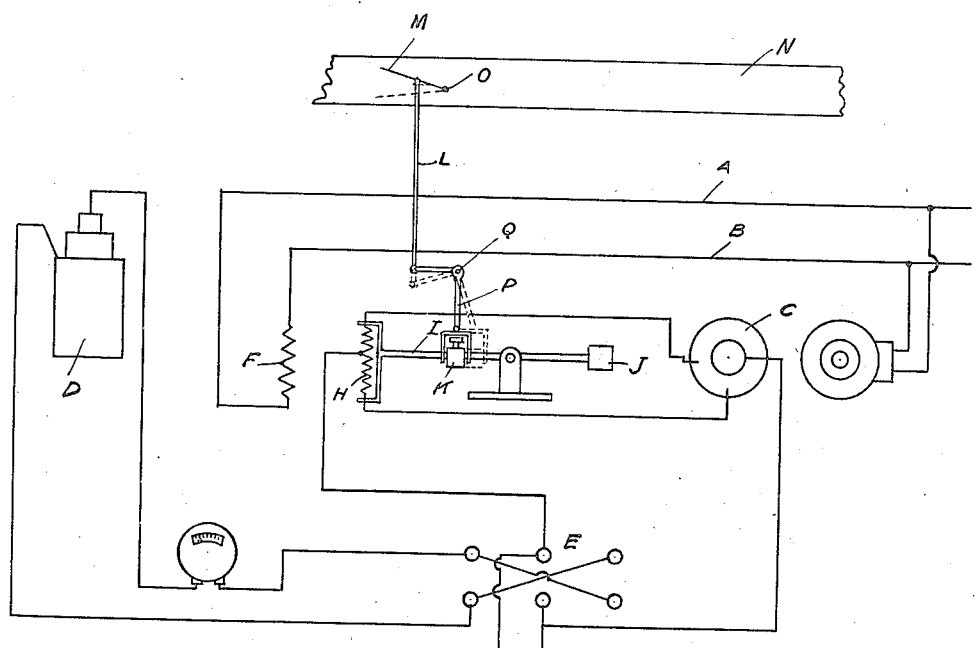
Figure 1 is a diagrammatic view of the wiring and equipment necessary to carry out our process.
Figure 2:
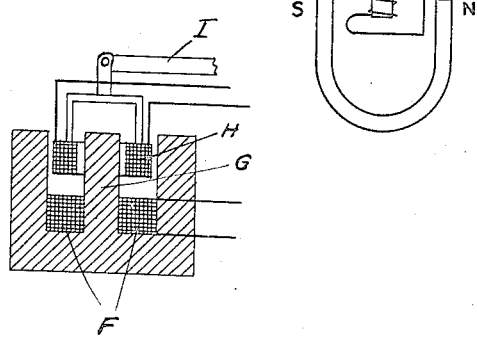
Figure 2 is a detail of a transformer.

The primary F of the transformer is fixed on the center leg G of the core, as shown in Figure 2. The secondary H encircles the same leg but is movable and mounted on a pivoted arm I provided with a counter weight J. A small weight K slidable to partially neutralize the counter weight is provided. When current is sent through the primary and a current is allowed to flow in the secondary, the latter is thrust upward away from the primary. As the distance increases, the current in the secondary and also the thrust decreases. As the upward thrust is always the same for any given current in the secondary, and as the movable weight K will give any desired constant downward thrust, the secondary will move until the two forces balance, the current thereby being kept constant. Obviously, any means for moving the weight K which is coordinated with the water flow will serve to maintain a fixed ratio of gas to water at any variable water flow.

In the drawing the movable weight K is coordinated with the water supply by means of a link L which is pivotally connected to a vane M in a water conduit N. The vane M is pivoted at O to rise and fall with the flow of water.

The lower end of link L is pivotally connected to one end of a bell crank lever P pivoted at Q and provided at the opposite end with a bifurcation adapted to move the weight K in either direction.

I claim:

The method of producing gas for water purification in a fixed proportion of gas to flowing water, which consists in producing chlorine gas from salt water in chemical cells by conducting an electrical current from a transformer through said cells, and coordinating the strength of said current with the flow of water.

In testimony whereof I affix my signature.

GEORGE N. BLANCHARD.